United States Patent
Welling

(10) Patent No.: US 11,867,270 B2
(45) Date of Patent: Jan. 9, 2024

(54) ELECTRONICALLY ACTUATED RAMP STYLE LOCKING DIFFERENTIAL HAVING LOCK DETECTION

(71) Applicant: Eaton Intelligent Power Limited, Dublin (IE)

(72) Inventor: Andrew Lee Welling, Fort Wayne, IN (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 38 days.

(21) Appl. No.: 17/679,729

(22) Filed: Feb. 24, 2022

(65) Prior Publication Data

US 2022/0186820 A1      Jun. 16, 2022

Related U.S. Application Data

(63) Continuation of application No. PCT/EP2020/025389, filed on Aug. 28, 2020.
(Continued)

(51) Int. Cl.
*F16H 48/40*      (2012.01)
*F16H 48/20*      (2012.01)
(Continued)

(52) U.S. Cl.
CPC ......... *F16H 48/40* (2013.01); *F16D 2300/18* (2013.01); *F16H 48/08* (2013.01);
(Continued)

(58) Field of Classification Search
CPC .................................................. F16D 2300/18
See application file for complete search history.

(56) References Cited

U.S. PATENT DOCUMENTS 5,465,819 A   11/1995   Weilant et al.
6,238,316 B1   5/2001   Sturm
(Continued)

FOREIGN PATENT DOCUMENTS

| EP | 2431714 A1 * | 3/2012 | ............. F16D 7/025 |
| KR | 20020056510 A | 7/2002 | |
| WO | 2006034053 A1 | 3/2006 | |

OTHER PUBLICATIONS

International Search Report and Written Opinion for International Application No. PCT/EP2020/025389 dated Nov. 2, 2020.

*Primary Examiner* — Ernesto A Suarez
*Assistant Examiner* — James J Taylor, II
(74) *Attorney, Agent, or Firm* — Squire Patton Boggs (US) LLP

(57) ABSTRACT

An electronically locking differential assembly according to the present disclosure includes a differential case, a first and second side gear, a lock actuation mechanism, a first and second tone wheel, a first and second pickup sensor and a controller. The lock actuation mechanism includes a ramp plate that selectively moves between a locked state and an unlocked state. The first tone wheel has a first plurality of teeth formed on the differential case. The second tone wheel has a second plurality of teeth formed on the ramp plate. The first pickup sensor senses a position of the first plurality of teeth. The second pickup sensor senses a position of the second plurality of teeth. The controller determines whether the lock actuation mechanism is in the locked or unlocked state based on the respective positions of the first and second plurality of teeth.

18 Claims, 6 Drawing Sheets

Related U.S. Application Data

(60) Provisional application No. 62/893,879, filed on Aug. 30, 2019.

(51) Int. Cl.
*F16H 48/34* (2012.01)
*F16H 48/24* (2006.01)
*F16H 48/08* (2006.01)

(52) U.S. Cl.
CPC ........ *F16H 48/24* (2013.01); *F16H 2048/204* (2013.01); *F16H 2048/343* (2013.01)

(56) References Cited

U.S. PATENT DOCUMENTS

| | | | |
|---|---|---|---|
| 6,511,395 B1 | 1/2003 | Irwin | |
| 6,551,209 B2 | 4/2003 | Cheadle et al. | |
| 7,264,568 B2 | 9/2007 | Ludwig et al. | |
| 9,200,684 B2 * | 12/2015 | Fujii | F16H 48/22 |
| 9,657,827 B2 * | 5/2017 | Gopal | F16H 48/24 |
| 9,689,484 B2 * | 6/2017 | Longueville | F16H 48/20 |
| 2008/0182702 A1 | 7/2008 | Donofrio et al. | |
| 2010/0298083 A1 | 11/2010 | Dayton | |

* cited by examiner

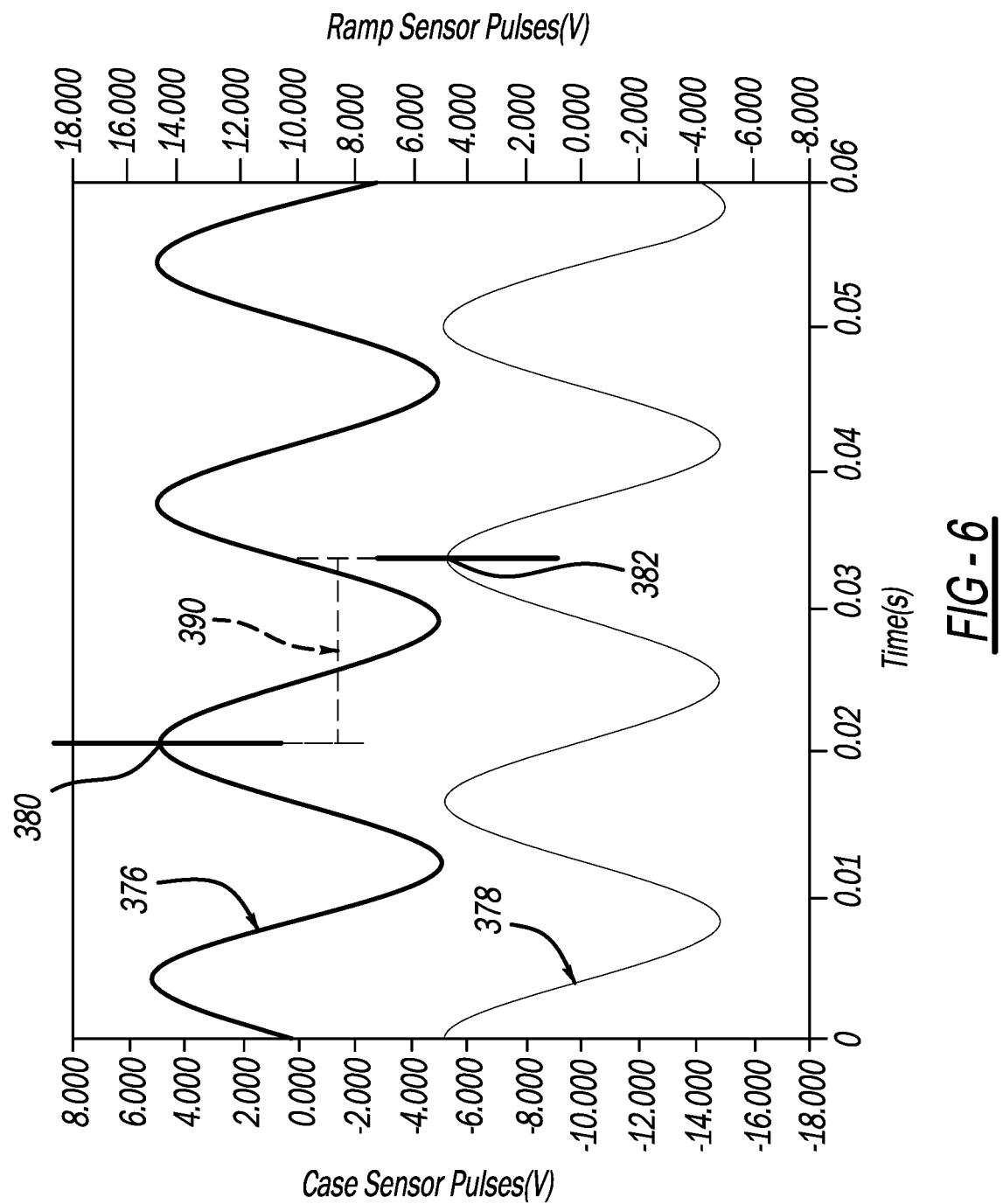

ELECTRONICALLY ACTUATED RAMP STYLE LOCKING DIFFERENTIAL HAVING LOCK DETECTION

CROSS-REFERENCE TO RELATED APPLICATIONS

This application is a continuation of International Application No. PCT/EP2020/025389 filed Aug. 28, 2020, which claims priority to U.S. Provisional Application No. 62/893,879 filed Aug. 30, 2019. The disclosure of the above application is incorporated herein by reference.

FIELD

The present disclosure relates generally to differential gear assemblies and more particularly to an electronically actuated ramp style locking differential having a lock detection mechanism.

BACKGROUND

A differential gear mechanism can be provided in an axle assembly and used to transfer torque from a driveshaft to a pair of output shafts. The driveshaft can drive the differential through the use of a bevel gear that meshes with a ring gear mounted to a housing of the differential. In automotive applications, a differential allows the tires mounted at either end of the axle assembly to rotate at different speeds. This is important when the vehicle is turning because the outer tire travels over an arc of greater distance than the inner tire. Thus, the outer tire must rotate at a faster speed than the inner tire to compensate for the greater distance of travel. The differential includes a differential case and a gear arrangement that allows torque to be transferred from the driveshaft to the output shafts while concurrently allowing the output shafts to rotate at different speeds as needed. The gear arrangement can generally include a pair of side gears that are mounted for rotation with the respective output shafts. A series of cross pins or pinion gear shafts are fixedly mounted to the differential case for rotation therewith. A corresponding plurality of pinion gears are mounted for rotation with the pinion gear shafts and are in meshing relationship with both of the side gears.

Some differential gear mechanisms include traction modifying differentials such as those that provide a locking function. Locking differentials include some sort of locking mechanism to prevent rotation of one of the side gears relative to the gear case, the engagement of the locking mechanism being initiated by some sort of actuator. By way of example only, the actuator could include a ball ramp mechanism in which rotation of a ramp plate is retarded relative to the gear case, this initiating ramping, in response to a signal being transmitted to an electromagnetic coil disposed adjacent the ramp plate. Other configurations are direct acting and utilize a dog clutch that is moved to interlock with the side gear by pressed in rods that are moved by movement of an armature as the coil is energized. In this regard, many configurations are available. Examples of locking differentials of the type described hereinabove are shown in U.S. Pat. Nos. 6,083,134 and 6,551,209, both of which are assigned to the assignee of the present disclosure and incorporated herein by reference.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An electronically locking differential assembly according to the present disclosure includes a differential case, a first and second side gear, a lock actuation mechanism, a first and second tone wheel, a first and second pickup sensor and a controller. The differential case defines first and second output shaft openings that are co-axially aligned along an axis of rotation of the differential case. The first and second side gears are rotatably mounted within the differential case. The first and second side gears are co-axially aligned along the axis of rotation of the differential case. The first side gear provides a first torque transmitting connection with a first output shaft. The second side gear provides a second torque transmitting connection with a second output shaft. The lock actuation mechanism includes a ramp plate that selectively moves between a locked state where the side gears are fixed for concurrent rotation and an unlocked state where the side gears rotate relative to each other. The first tone wheel has a first plurality of teeth formed on the differential case. The second tone wheel has a second plurality of teeth formed on the ramp plate. The first pickup sensor senses a position of the first plurality of teeth. The second pickup sensor senses a position of the second plurality of teeth. The controller determines whether the lock actuation mechanism is in the locked or unlocked state based on the respective positions of the first and second plurality of teeth.

In other features, the lock actuation mechanism further comprises push rods that respectively locate in valleys of the ramp plate. The first plurality of teeth are integrally formed on the differential case. The second plurality of teeth are integrally formed on the ramp plate. The first pickup sensor is statically arranged proximate to the differential case. The second pickup sensor is statically arranged proximate to the ramp plate. The first and second side gears are intermeshed with pinion gears to form a torque transfer arrangement configured for transferring torque between the pinion gears and the first and second side gears to rotate the first and second side gears about the axis of rotation. The torque transfer arrangement can also be configured for allowing the first and second side gears to rotate at different rotational speeds with respect to one another about the axis of rotation in the unlocked state.

An electronically locking differential assembly constructed in accordance to additional features of the instant application includes a differential case, a first and second side gear, a lock actuation mechanism, a first sensor, a second sensor and a controller. The differential case defines first and second output shaft openings that are co-axially aligned along an axis of rotation of the differential case. The differential case can comprise a first plurality of teeth formed around an outer surface thereof. The first and second side gears are rotatably mounted within the differential case. The first and second side gears are co-axially aligned along the axis of rotation of the differential case. The first side gear provides a first torque transmitting connection with a first output shaft. The second side gear provides a second torque transmitting connection with a second output shaft. The lock actuation mechanism includes a ramp plate that selectively moves between a locked state where the side gears are fixed for concurrent rotation and an unlocked state where the side gears rotate relative to each other. The ramp plate comprises a second plurality of teeth formed around an outer surface thereof. The first sensor senses a rotational position of the first plurality of teeth. The second sensor senses a rotational position of the second plurality of teeth. The controller determines whether the lock actuation mechanism is in the locked or unlocked state based on the respective positions of the first and second plurality of teeth. The controller outputs a signal based on the determination.

In other features, the lock actuation mechanism further comprises push rods that respectively locate in valleys of the ramp plate. The first pickup sensor is statically arranged proximate to the differential case. The second pickup sensor is statically arranged proximate to the ramp plate. The first plurality of teeth are integrally formed on the differential case. The second plurality of teeth are integrally formed on the ramp plate. The first and second side gears are intermeshed with pinion gears to form a torque transfer arrangement configured for transferring torque between the pinion gears and the first and second side gears to rotate the first and second side gears about the axis of rotation. The torque transfer arrangement can also be configured for allowing the first and second side gears to rotate at different rotational speeds with respect to one another about the axis of rotation in the unlocked state.

A method of determining whether an electronically locking differential assembly is in an unlocked state or a locked state includes providing a differential case having a first plurality of teeth formed around an outer surface thereof. A ramp plate is provided having a second plurality of teeth formed around an outer surface thereof. A first position of at least one tooth of the first plurality of teeth is sensed. A second position of at least one tooth of the second plurality of teeth is sensed. A controller determines whether the electronically locking differential assembly is in the unlocked or locked state based on the first and second positions. The controller outputs a signal based on the determination.

According to other features, sensing the first position comprises sensing the first position from a first pickup sensor that is statically arranged proximate to the differential case. Sensing the second position comprises sensing the second position from a second pickup sensor that is statically arranged proximate to the ramp plate. Outputting the signal from the controller comprises outputting the signal to an instrument cluster that conveys a locked or unlocked state of the electronically locking differential assembly.

BRIEF DESCRIPTION OF THE DRAWINGS

The present disclosure will become more fully understood from the detailed description and the accompanying drawings, wherein:

FIG. 6 is a plot illustrating case sensor pulses on the case and the ramp plate showing phase lag with the electronic locking differential in a locked state.

DETAILED DESCRIPTION

Figure 1:
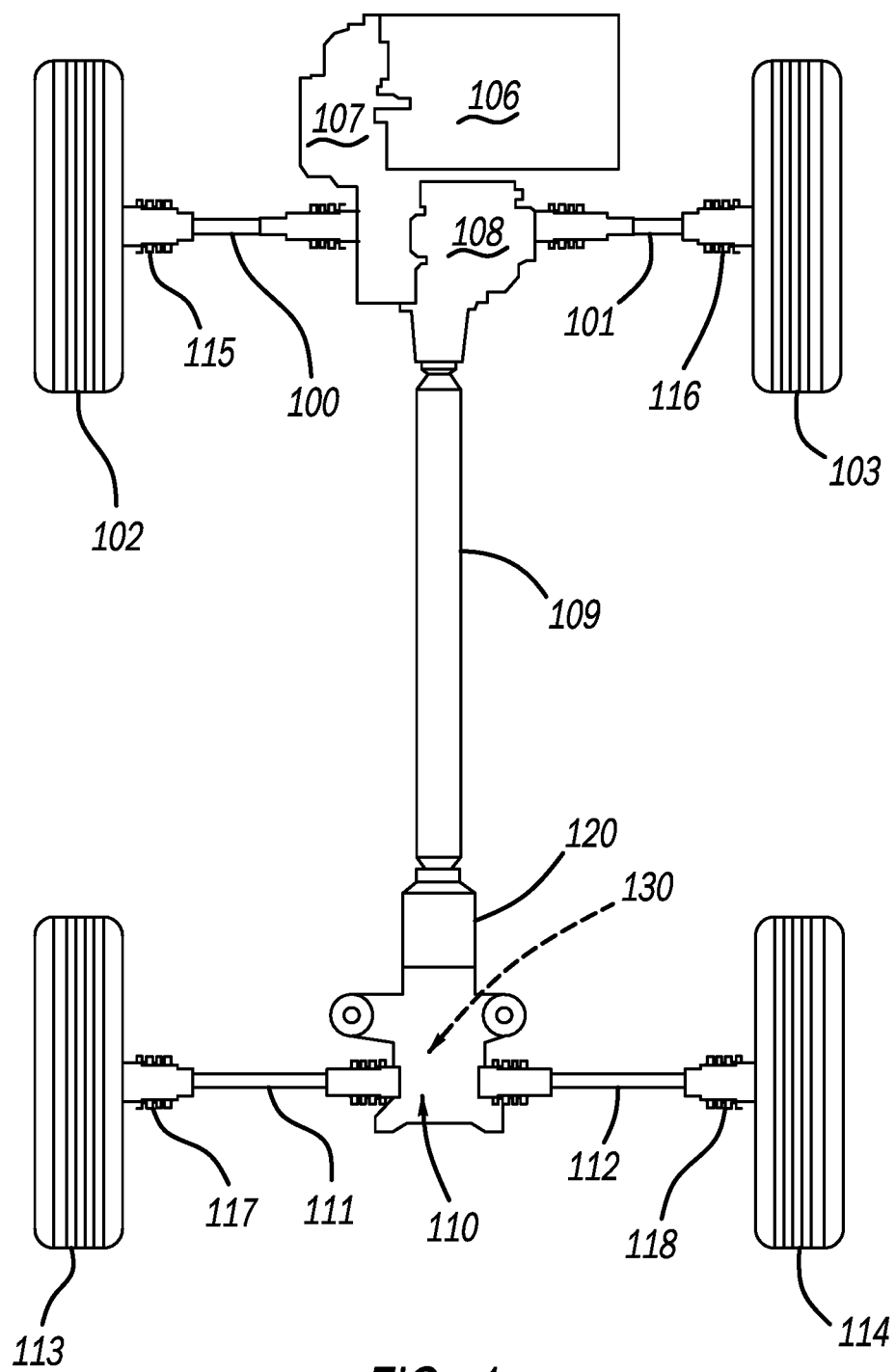
FIG. 1 is a schematic example of a simplified vehicle driveline.

With initial reference to FIG. 1, an exemplary vehicle driveline is shown. In the example shown, the vehicle is front wheel drive, meaning the primary motive power is connected to the front drive axle. The engine 106, transmission 107, and power transfer unit 108 are operatively connected at the front of the vehicle to transmit torque directly to a front left axle 100, and front right axle 101. Wheels 102 and 103 receive torque through wheel hubs 115 and 116 to provide traction to the vehicle. Via mechanisms in the power transfer unit 108, such as a hypoid gear and pinion, the drive shaft 109 receives torque and transmits it to the rear of the vehicle. An optional all-wheel drive coupling 120 connects to the drive shaft 109, and a rear drive unit 110 may house an electronically locking differential 130.

The rear electronically locking differential 130 may be operated in either an open or locked mode. In an open mode, the left rear wheel 113, via wheel hub 117 and left rear axle 111, can spin at a speed that is different from the right wheel 114. Likewise, the right rear wheel 114, via wheel hub 118 and right rear axle 112, can spin at a different speed than left rear wheel 113. In the locked mode, both left and right rear wheels 113 and 114 receive the same torque because the left and right rear axle 111 and 112 are locked via internal components in the rear differential 130. The driveline of FIG. 1 is an example and it will be appreciated that the principles may be used in rear wheel drive vehicles or in a vehicle having more than one differential device.

Figure 2:
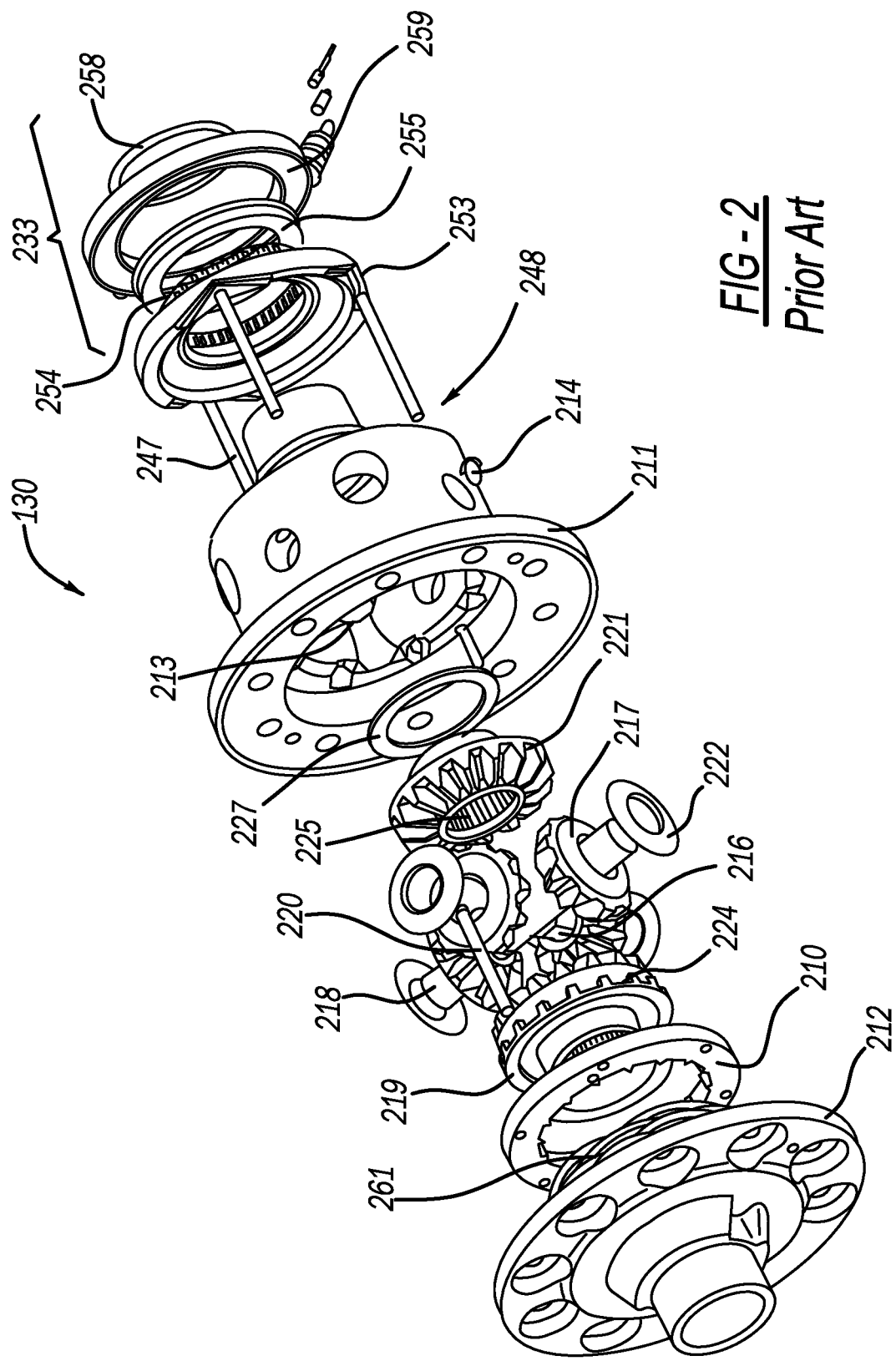
FIG. 2 is an exploded view of an exemplary electronic locking differential according to one prior art example.

With reference to FIG. 2 an electronically locking differential 130 constructed in accordance to one prior art example is shown. The electronically locking differential 130 includes a differential gear case 213 having a pair of input pinion gears 217. The pinion gears 217 comprise the input gears of the differential gear set, and are in meshing engagement with a pair of side gears 219 and 221. When the ring gear, fixed to the right hand case 211 spins, the pinion shaft 218 spins with it. This in turn spins the side gears 219 and 221. The side gears 219 and 221 includes sets of internal, straight splines 223 and 225, respectively, which are in splined engagement with mating external splines on respective left and right rear output or axle shafts 111 and 112. As the ring gear rotates, the rear axle shafts 111 and 112 rotate.

When the electronically locking differential 130 operates in an open mode, during normal, straight ahead operation of the vehicle, no differentiation occurs between the left and right axles 111 and 112, or between the left and right side gears 219 and 221. Therefore, the pinion gears 217 do not rotate relative to the pinion shaft 218. As a result, the left and right hand gear case 212 and 211, the pinion gears 217, and the side gears 219 and 221 all rotate about an axis of rotation A, as if comprising a solid unit. However, if the vehicle turns or experiences turbulence that causes the rear wheels 113 and 114 to spin at different rates, the pinion gears 217 rotate around the pinion shaft 218 and 216 to enable different side gear speeds with respect to the pinion shaft rotation. In some situations it may be desirable to lock the left and right rear axles 111 and 112 so that they must spin at the same rate. Thus, during the locked mode, a side gear is locked to the housing so that it must rotate with the pinion shaft 218. In the example shown in FIG. 2, the left side gear 219 is locked via the meshing engagement, this locks the pinion gears 217 with respect to side gear 219, which also locks the side gear 221.

When the pinion shaft 218 rotates, the side gears 219 and 221 rotate and thus the rear axles 111 and 112 rotate. In an unlocked, or open mode, each side gear 219 and 221 can rotate at a different speed than the other side gear because the side gears can turn with respect to the pinions 217 at different rates of speed. In the locked mode, the locker gear 219 is coupled to the lock plate 210. The right hand case 211 is coupled to the ring gear to turn as the drive shaft pinion applies rotational force. Because the locker gear 219 is locked via lock plate 210 to rotate with the differential case 213 at the same rate as the pinion shaft 218, the right hand side gear 221 is also locked from differential rotation and must likewise rotate at the same rate as the locker gear 219. In this regard, rear axle 111 and 112 rotates at the same rate via the locked differential 130.

Actuation mechanism 233 includes electrical leads 259 that couple to an activation switch or other control means to power a stator. The powered or unpowered state of the stator determines whether a ramp plate 253 is ramped up or ramped down. When ramped up, the ramp plate 253 is turned to push peak areas on the ramp plate 253 against push rods 247 which urges the push rods 247 towards the lock pate 210. The lock plate 210 slides axially in a recess in the right hand case 211. In the ramped down position, the ramp plate 253 is turned so that the push rods can rest in valleys of the ramp plate 253. A wave spring can push the lock plate 210 which can in turn push the push rods 247 into the valleys.

Turning now to FIGS. 3-6 an electronically locking differential 300 having a lock status detection assembly 310 constructed in accordance to the present disclosure will be described. Unless otherwise described, the electronically locking differential 300 can operate in a locked and unlocked condition as described above with respect to the electronically locking differential 130. The electronically locking differential 130 generally includes a differential case 320 and a ramp plate 322. The differential case 320 defines first and second output shaft openings 324, 326 that are co-axially aligned along an axis of rotation 328 of the differential case 320. First and a second side gears (see also 219 and 221, FIG. 2) are rotatably mounted within the differential case 320, the first and second side gears being co-axially aligned along the axis of rotation of the differential case 320. The first side gear defines a first shaft opening configured to provide a first torque transmitting connection with a first output shaft received within the first output shaft opening. The second side gear defines a second output shaft opening configured to provide a second torque transmitting connection with a second output shaft received within the second output shaft opening. A lock actuation mechanism (see also 233, FIG. 2) selectively moves between a locked state where the side gears are fixed for concurrent rotation and an unlocked state where the side gears rotate relative to each other.

As will become appreciated from the following discussion, the lock status detection assembly 310 uses a tone wheel and sensor pickup to decipher the positon of the differential case 320 and the ramp plate 322 in relation to each other. In this regard, an unlocked differential will have the differential case 320 and the ramp plate 322 in phase. A locked differential will have the differential case 320 and the ramp plate 322 out of phase. By knowing the status of the electronically locking differential 300, a driver is able to more accurately predict driving and vehicle behaviors.

Figure 3:
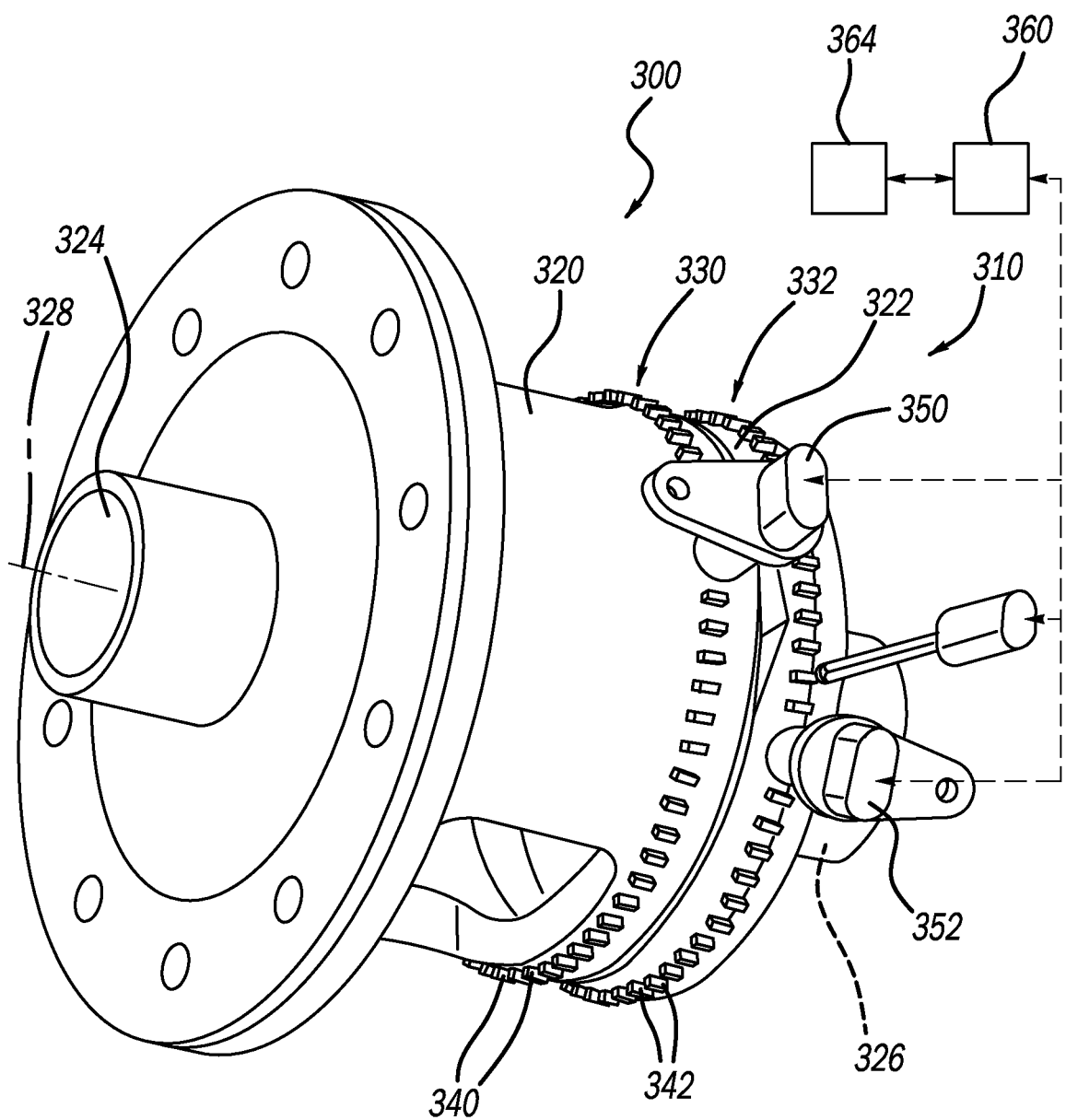
FIG. 3 is a perspective view of an electronic locking differential having a lock detection assembly constructed in accordance to one example of the present disclosure.
Figure 4:
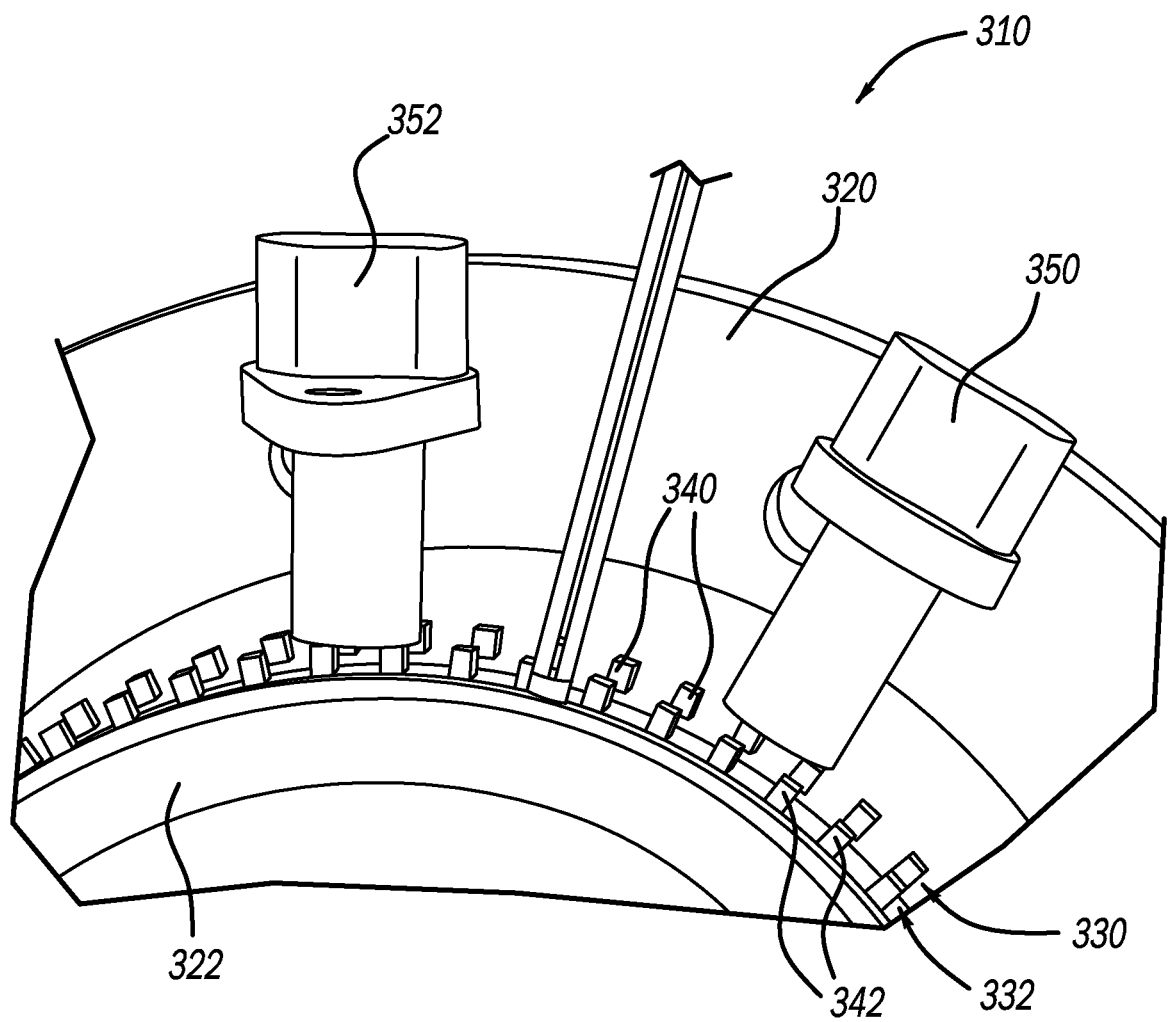
FIG. 4 is a detail view of the lock detection assembly of FIG. 3.

With particular reference to FIGS. 3 and 4, the lock status detection assembly 310 will be further described. The differential case 320 includes a first tone wheel 330. The ramp plate 322 includes a second tone wheel 332. The first and second tone wheels 330 and 332 can comprise a respective first and second plurality of teeth 340 and 342. In some examples, the first plurality of teeth 340 can be integrally formed with the differential case 320. Similarly the second plurality of teeth 342 can be integrally formed with the ramp plate 322. A first pickup sensor 350 is statically arranged proximate the first tone wheel 330 for sensing the first plurality of teeth 340. A second pickup sensor 352 is statically arranged proximate the second tone wheel 332 for sensing the second plurality of teeth 342.

As described above, a ramp style electronically locking differential operates by using an electromagnetic coil to provide resistance torque on the ramp plate 322. The ramp plate 322 then rotates independently of the differential case 320 and allows the locking mechanisms internally to engage. Because the ramp plate 322 rotates relative to the differential case 320, the first and second tone wheels 330 and 332 can allow for the determination of position of each of the differential case 320 and the ramp plate 322. The electronically locking differential 300 requires differential case 320 or ramp plate 322 rotation to occur to allow for locking and unlocking to occur. The relative rotation of the differential case 320 and the ramp plate 322 can be sensed with voltage pulses to an electronical control unit (ECU) 360. The ECU 360 can store position algorithms that can be used to calibrate how much relative rotation (pulses in phase or out of phase, i.e., phase lag) that needs to occur to determine whether the differential assembly 300 has locked or unlocked from a previous state. In some examples, the ECU 360 can send a signal to an instrument cluster 364 or the vehicle conveying to the driver that the electronically locking differential assembly 300 is locked or unlocked. The instant disclosure allows for stationary sensors on the axle and no telemetry systems needed within the axle.

Figure 5:
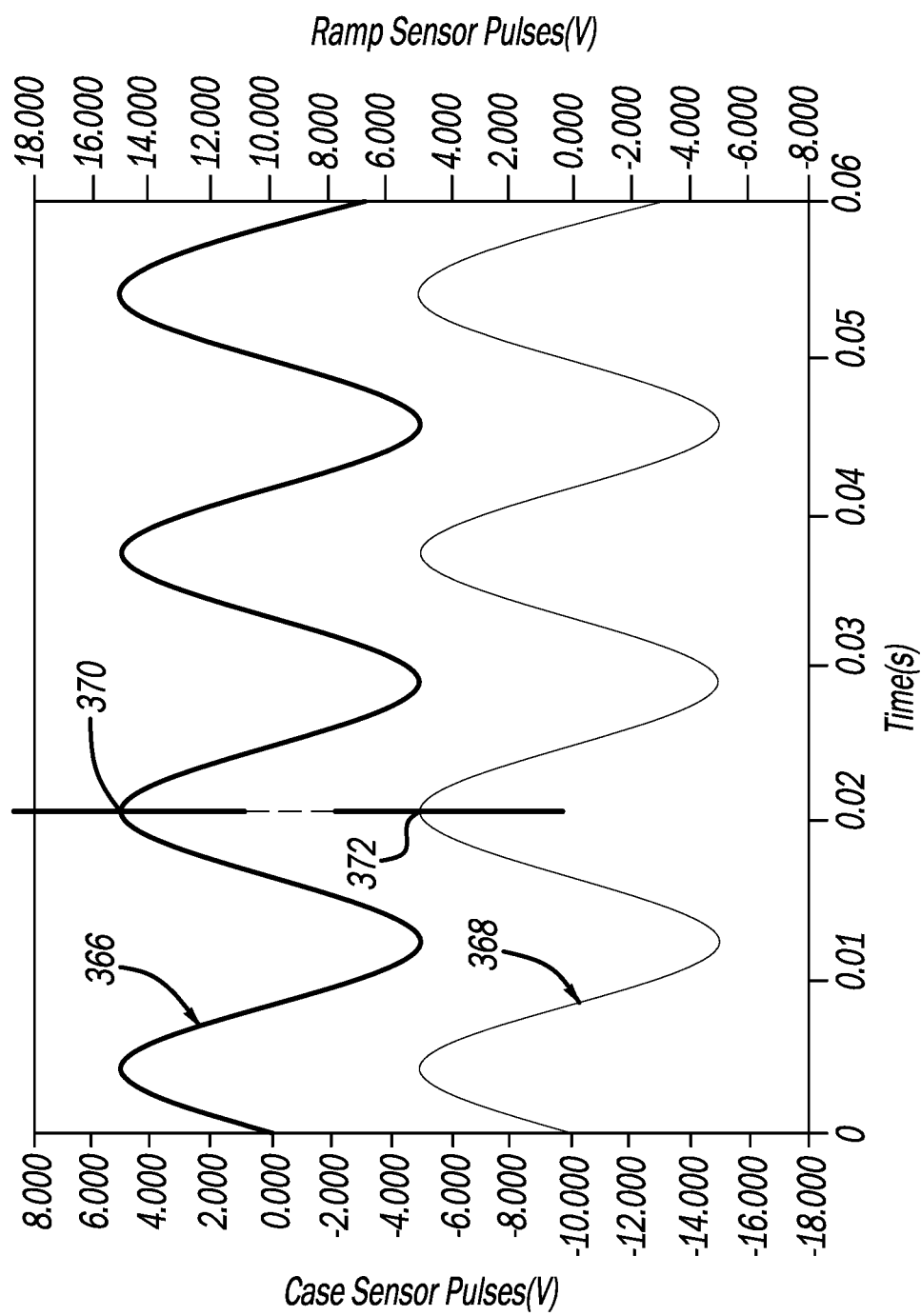
FIG. 5 is a plot illustrating case sensor pulses on the case and the ramp plate showing no phase lag with the electronic locking differential in an unlocked state.

With reference to FIG. 5, the differential assembly 300 (FIG. 3) is shown in an unlocked state. A first trace 366 represents pulses sensed by the differential case sensor 350. A second trace 368 represents pulses sensed by the ramp plate sensor 352. In the unlocked state, no phase lag exists between a reference peak 370 of the differential case 320 and a corresponding reference peak 372 of the ramp plate 322.

With reference to FIG. 6, the differential assembly 300 (FIG. 3) is shown in a locked state. A first trace 376 represents pulses sensed by the differential case sensor 350. A second trace 378 represents pulses sensed by the ramp plate sensor 352. In the locked state, a phase lag 390 exists between a reference peak 380 of the differential case 320 and a corresponding reference peak 382 of the ramp plate 322.

By way of example, the ramp plate 322 can be configured to rotate about 18 degrees relative to the differential case 320 from an unlocked state to a locked state. It is appreciated that other degrees of rotation are contemplated between unlocked and locked within the scope of the disclosure. Software logic within the ECU 360 can determine from the signals from the differential case sensor 350 and ramp plate sensor 352 what position (locked or unlocked) the electronically locking differential 300 is in. In particular, the ECU 360 can store teeth count of the first and second plurality of teeth 340 and 342 and establish triggers to compare signals between the sensors 350 and 352 to decipher the position and therefore the state of lock of the differential assembly 300.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. An electronically locking differential assembly comprising:
   a differential case defining first and second output shaft openings that are co-axially aligned along an axis of rotation of the differential case;
   a first and a second side gear rotatably mounted within the differential case, the first and second side gears being co-axially aligned along the axis of rotation of the differential case, the first side gear providing a first torque transmitting connection with a first output shaft, the second side gear providing a second torque transmitting connection with a second output shaft;
   a lock actuation mechanism including a ramp plate that selectively moves between a locked state where the side gears are fixed for concurrent rotation and an unlocked state where the side gears rotate relative to each other;
   a first tone wheel having a first plurality of teeth formed on the differential case;
   a second tone wheel having a second plurality of teeth formed on the ramp plate;
   a first pickup sensor that senses a position of the first plurality of teeth;
   a second pickup sensor that senses a position of the second plurality of teeth; and
   a controller that determines whether the lock actuation mechanism is in the locked or unlocked state based on whether a phase lag exists between a first reference peak and a second reference peak, the first reference peak corresponding to the position of the first plurality of teeth and the second reference peak corresponding to the position of the second plurality of teeth.

2. The electronically locking differential assembly of claim 1 wherein the lock actuation mechanism further comprises push rods that respectively locate in valleys of the ramp plate.

3. The electronically locking differential assembly of claim 1 wherein the first plurality of teeth are integrally formed on the differential case.

4. The electronically locking differential assembly of claim 1 wherein the second plurality of teeth are integrally formed on the ramp plate.

5. The electronically locking differential assembly of claim 1 wherein the first pickup sensor is statically arranged proximate to the differential case.

6. The electronically locking differential assembly of claim 5 wherein the second pickup sensor is statically arranged proximate to the ramp plate.

7. The electronically locking differential assembly of claim 1 wherein the first and second side gears are intermeshed with pinion gears to form a torque transfer arrangement configured for transferring torque between the pinion gears and the first and second side gears to rotate the first and second side gears about the axis of rotation, the torque transfer arrangement also being configured for allowing the first and second side gears to rotate at different rotational speeds with respect to one another about the axis of rotation in the unlocked state.

8. An electronically locking differential assembly comprising:
   a differential case defining first and second output shaft openings that are co-axially aligned along an axis of rotation of the differential case, the differential case comprising a first plurality of teeth formed around an outer surface thereof;
   a first and a second side gear rotatably mounted within the differential case, the first and second side gears being co-axially aligned along the axis of rotation of the differential case, the first side gear providing a first torque transmitting connection with a first output shaft, the second side gear providing a second torque transmitting connection with a second output shaft;
   a lock actuation mechanism including a ramp plate that selectively moves between a locked state where the side gears are fixed for concurrent rotation and an unlocked state where the side gears rotate relative to each other, the ramp plate comprising a second plurality of teeth formed around an outer surface thereof;
   a first sensor that senses a rotational position of the first plurality of teeth;
   a second sensor that senses a rotational position of the second plurality of teeth; and
   a controller that (i) determines whether the lock actuation mechanism is in the locked or unlocked state based on whether a phase lag exists between a first reference peak and a second reference peak, the first reference peak corresponding to the position of the first plurality of teeth and the second reference peak corresponding to the position of the second plurality of teeth and (ii) outputs a signal based on the determination.

9. The electronically locking differential assembly of claim 8 wherein the lock actuation mechanism further comprises push rods that respectively locate in valleys of the ramp plate.

10. The electronically locking differential assembly of claim 8 wherein the first sensor is statically arranged proximate to the differential case.

11. The electronically locking differential assembly of claim 10 wherein the second sensor is statically arranged proximate to the ramp plate.

12. The electronically locking differential assembly of claim 8 wherein the first plurality of teeth are integrally formed on the differential case.

13. The electronically locking differential assembly of claim 8 wherein the second plurality of teeth are integrally formed on the ramp plate.

14. The electronically locking differential assembly of claim 8 wherein the first and second side gears are intermeshed with pinion gears to form a torque transfer arrangement configured for transferring torque between the pinion gears and the first and second side gears to rotate the first and second side gears about the axis of rotation, the torque transfer arrangement also being configured for allowing the first and second side gears to rotate at different rotational speeds with respect to one another about the axis of rotation in the unlocked state.

15. A method of determining whether an electronically locking differential assembly is in an unlocked state or a locked state, the method comprising:
   providing a differential case having a first plurality of teeth formed around an outer surface thereof;
   providing a ramp plate having a second plurality of teeth formed around an outer surface thereof;
   sensing a first position of at least one tooth of the first plurality of teeth; sensing a second position of at least one tooth of the second plurality of teeth;

determining, with a controller, whether the electronically locking differential assembly is in the unlocked state or the locked state based on whether a phase lag exists between a first reference peak and a second reference peak, the first reference peak corresponding to the first position and the second reference peak corresponding to the second position; and outputting a signal, from the controller, based on the determination.

16. The method of claim 15 wherein sensing the first position comprises sensing the first position from a first pickup sensor that is statically arranged proximate to the differential case.

17. The method of claim 16 wherein sensing the second position comprises sensing the second position from a second pickup sensor that is statically arranged proximate to the ramp plate.

18. The method of claim 15 wherein outputting the signal from the controller comprises outputting the signal to an instrument cluster that conveys the locked or unlocked state.

\* \* \* \* \*